March 19, 1963 A. E. GRAY ET AL 3,081,872

CARD PROCESSING APPARATUS

Filed June 8, 1959 5 Sheets-Sheet 1

INVENTORS:
Alfred E. Gray
Herman J. Malin
Harold B. Thompson

By Smyth & Roston
Attorneys

INVENTORS:
Alfred E. Gray
Herman J. Malin
Harold B. Thompson
By Smyth & Roston
Attorneys INVENTORS:
Alfred E. Gray
Herman J. Malin
Harold B. Thompson By [signature]
Attorneys, INVENTORS:
Alfred E. Gray
Herman J. Malin
Harold B. Thompson
By Smyth & Roston
Attorneys March 19, 1963 A. E. GRAY ET AL 3,081,872

CARD PROCESSING APPARATUS

Filed June 8, 1959 5 Sheets-Sheet 5

INVENTORS:
Alfred E. Gray
Herman J. Malin
Harold B. Thompson

By Smyth & Roston

Attorneys,

United States Patent Office 3,081,872 Patented Mar. 19, 1963

3,081,872
CARD PROCESSING APPARATUS

Alfred E. Gray and Herman J. Malin, Culver City, and Harold B. Thompson, Playa Del Rey, Calif., assignors to Magnavox Company, Los Angeles, Calif., a corporation of Delaware Filed June 8, 1959, Ser. No. 818,830
19 Claims. (Cl. 209—74)

This invention relates to information card processing apparatus, and it relates more particularly to an improved gate transfer mechanism for use in such apparatus for obtaining a transfer of cards, or other discrete information storage elements, from one transport medium of the apparatus to another.

Digital techniques have been used in card processing systems for storing information and data on a plurality of cards for future use. Each of the cards is provided with a number of positions which, in turn, are arranged into a number of fields, and which are used for storing a corresponding number of columns of information. Each of the columns, for example, may contain a plurality of binary bits arranged in an ordinal sequence to represent a multi-digit number or a selected character. The term "cards" is used herein in a generic sense, as other discrete elements, such as plates, or the like, may be used.

The individual binary bits referred to in the preceding paragraph may be represented, for example, by individual magnetic dots of a north polarity for binary "1" and of a south polarity for binary "0," or vice versa. The apparatus to be described is of the type utilizing cards bearing magnetic recordings. However, the information may be recorded on the cards in other ways, such as by patterns of holes, or by black and white areas, etc.

Patent No. 2,965,291 granted December 20, 1960, in the name of Robert M. Hayes et al., discloses a card processing system and apparatus which utilizes cards of the type described above and which cards have information magnetically recorded on them. In the apparatus of the copending case, the cards are supported in a stacked condition in a plurality of card feeding stations. The card feeding stations are disposed adjacent one or more rotatable vacuum pressure transport drums. These drums serve to transport the cards in sequence from the different feeding stations past a plurality of transducer stations which develop electrical control signals. The resulting control signals developed by the transducer stations as the cards are processed by them are used to control gate transfer mechanisms, and other mechanisms, so that the cards may be selectively transferred from one drum to another in accordance with a prearranged handling program, and so that the cards may be selectively fed to different stacking stations in accordance with that program.

In systems and apparatus of the type described in the copending application, it is possible to select one or more desired cards from a multiplicity of cards for further processing, and it is possible to achieve this quickly and accurately. Such further processing, for example, may consist of reading the information recorded on the selected card or recording new information on it.

Other systems and apparatus have also been described which utilize feeding and stacking stations of the type referred to above, in conjunction with suitable transport media, such as the vacuum pressure rotatable transport drums referred to above, for rapidly performing many handling operations on the cards themselves. Such operations, for example, may involve merging, sorting, collating or otherwise handling of the cards.

Apparatus of the type mentioned in the preceding paragraph is described, for example, in copending application Serial No. 566,404 filed February 20, 1956, in the name of Jerome B. Wiener, Patent No. 3,023,894; and in Patent No. 2,988,216 granted June 13, 1961, in the name of Robert Hayes et al.

In the apparatus disclosed and claimed in the copending applications referred to above, gate transfer mechanisms are provided for obtaining the transfer of the cards from one rotatable vacuum pressure transport drum to another so that the required processing, sorting, merging, etc., of the cards may be carried out. These gates are operated and controlled by suitable logic circuitry which responds to the control signals developed by the transducer stations as such stations read the information on the cards carried past them by the transport drums.

Copending application Serial No. 562,154 filed January 30, 1956, in the name of Stuart L. Peck et al., now Patent No. 3,016,140, discloses gate transfer mechanisms which are suitable for the purposes discussed in the preceding paragraph. The gate transfer mechanism of the Peck application is controllable to direct streams of pressurized fluid, such as air, in a direction tangential to the periphery of the transport drum from which a transfer is to be effectuated and in the opposite direction to the movement of cards by that drum. The streams of pressurized fluid from the gate transfer mechanism function to strip the cards from the periphery of the drum and to bring each card which is so stripped under the influence of the vacuum pressure of an adjacent drum. This enables the cards to be transferred from the first drum to the adjacent drum.

Solenoid actuated valves are included in the supply line to the gate transfer mechanisms referred to above, so that the streams of pressurized fluid issuing from these mechanisms may be initiated and terminated at will. This permits logical control circuitry to respond to the control signals derived from the processing of the cards by the transducer stations to control the solenoid valves so that selected cards only may be transferred from one transport drum to another. A suitable solenoid-actuated valve for this purpose is described and claimed, for example, in copending application Serial No. 685,581 which was filed September 23, 1957, in the name of Alfred M. Nelson et al., now Patent No. 3,001,549.

The present invention is also concerned with gate transfer mechanisms of the pneumatic type mentioned above and which are intended to control the selective transfer of cards from one transport medium to another. Such transport media may be the rotatable vacuum pressure drums referred to above and disclosed and claimed, for example, in Patent No. 2,883,189 granted April 21, 1959, in the name of Loren R. Wilson. It will become evident as the present description proceeds, however, that the gate transfer mechanism to be described is suitable for obtaining the control and selective transfer of cards from many different types of transporting means and from other means, and it is not limited in its application specifically to the rotatable vacuum-pressure drum type of transport.

The gate transfer mechanism of the invention is advantageous in that it is constructed in an improved manner in the form of a compact, rugged and rigid unit. The mechanism may be controlled to obtain the transfer of cards in either direction from a first drum to a second drum or from the second drum back to the first drum.

The gate transfer mechanism of the invention is also advantageous in that it is constructed in a novel and unique manner to develop a plurality of pressurized streams for effecting the desired selective card transfer, which streams exhibit negligible turbulence so that each card to be transferred is to be transferred by a sharp and positive force. This eliminates any tendency for the transferred cards to become mis-aligned and jammed, which has occasionally proven to be a problem in the past.

The improved gate transfer mechanism of the invention is also advantageous in that the cards are transferred smoothly and evenly from one drum to another and without the trailing edge of the transferred cards having a tendency to flap against the surface of the transport medium to which it is transferred. This also has occasionally proved to be a problem in the past, and this feature obviates any tendency for the transferred cards to become mis-aligned and jammed, and it also reduces wear of the cards.

Further features and advantages of the invention will become apparent from a consideration of the following specification which is directed to one embodiment of the invention, and from a consideration of the accompanying drawings which illustrate the embodiment and which also illustrates suitable card processing apparatus in which the embodiment may be incorporated.

Figures 5, 5A:
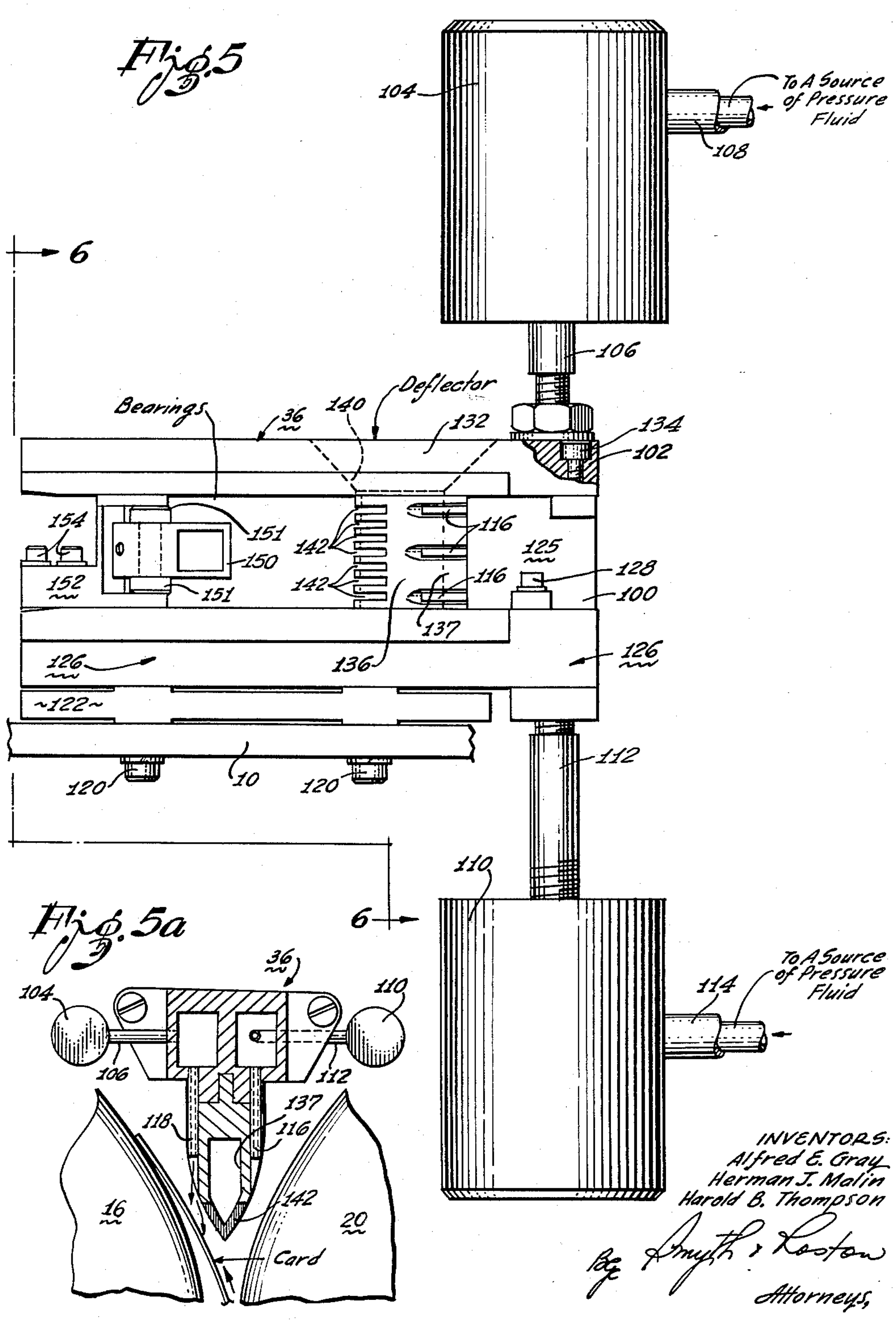
Figures 6, 7:
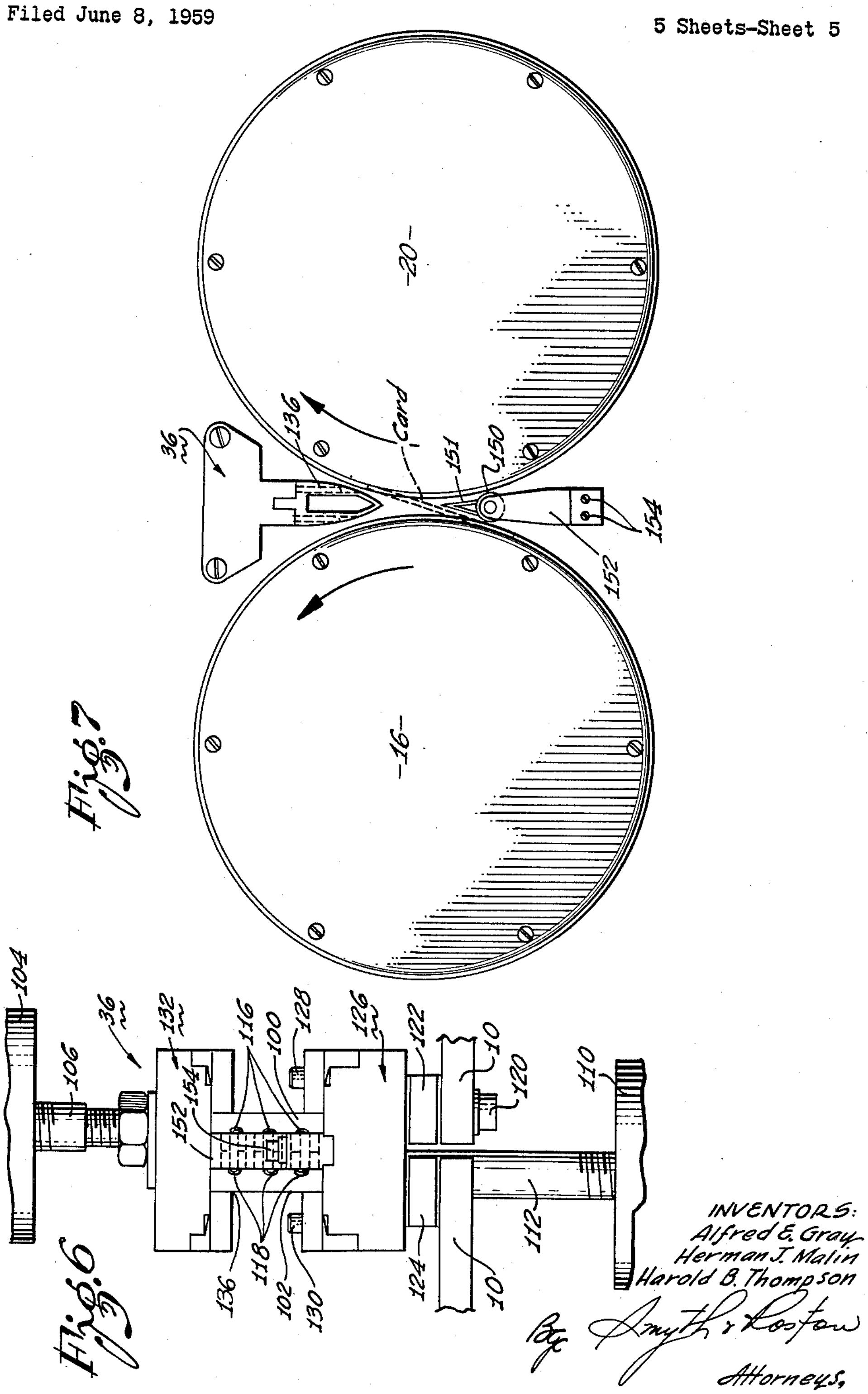

FIGURE 5 is a side elevational view of a pneumatic gate transfer mechanism constructed in accordance with the invention, the view of FIGURE 5 illustrating an apertured guiding surface which is used in the transfer mechanism to prevent turbulence, and the view of FIGURE 5 also illustrating a rotatable member which is positioned to engage the trailing edges of the transferred cards to prevent such edges from violently striking the surface of the drum to which the cards are transferred;

FIGURE 5*a* is a plan view illustrating, on a sectional basis for purposes of clarity, further details of the gate transfer mechanism shown in FIGURE 5;

FIGURE 6 is an end view of the pneumatic gate transfer mechanism of FIGURE 5, this mechanism being used to obtain a controlled transfer of cards between respective adjacent pairs of drums; and FIGURE 7 is a schematic top plan view of a pair of transport drums and of the gate transfer mechanism illustrated in FIGURES 5 and 6 (with certain guides and other components removed for purposes of clarity); the view of FIGURE 7 showing the manner in which a card is transferred from one of the drums to another by the gate transfer mechanism.

Figure 1:
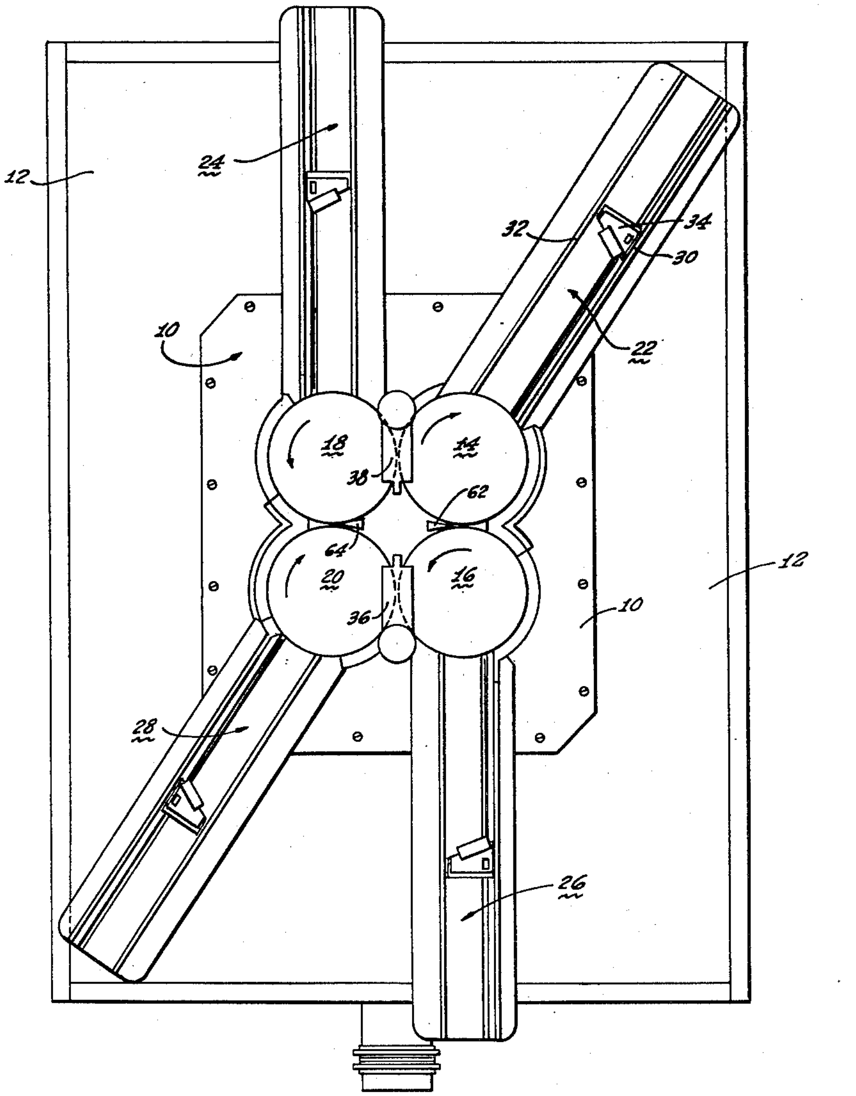
FIGURE 1 is a top plan view in somewhat schematic form of a typical card processing apparatus in which the gate transfer mechanism of the invention may be incorporated, the illustrated apparatus including four rotatable vacuum pressure transport drums and a corresponding number of feeding-stacking stations respectively associated with the drums.

The card processing apparatus of FIGURE 1 may be positioned on a table top 10 which, in turn, is supported by an appropriate supporting means 12 to lie in a horizontal plane. A group of four rotatable vacuum pressure transport drums are rotatably mounted on the table top 10. These drums are designated 14, 16, 18 and 20 respectively, and they are positioned in the illustrated manner on the table top to be adjacent one another.

The rotatable vacuum pressure transport drums may be constructed in the manner disclosed and claimed in the Patent No. 2,883,189 referred to above. Each of these drums, for example, has a hollow interior and each has a plurality of axially spaced slots extending around its peripheral surface. A vacuum pressure is established in the interior of the drum, and this creates a vacuum force at its peripheral edge. The vacuum force created at the peripheral edge of each drum serves to retain the cards firmly on that surface, so that the drums may transfer the cards from one point to another. As noted, the details of such drums are fully described in the copending application 600,975. It should be pointed out that any other suitable transport means may be used for carrying the cards through the apparatus.

In the apparatus illustrated in FIGURE 1, the drums 14 and 20 are driven in a clockwise direction, and the drums 16 and 18 are driven in a counter clockwise direction. As will be described in conjunction with FIGURE 2, a suitable mechanical transfer unit 62 may be placed between the drums 16 and 14 so that cards carried to it by the drum 16 are transferred to the drum 14. A similar mechanical transfer unit 64 may be positioned adjacent the drum 18, and between it and the drum 20, so that cards carried to the unit 64 by that drum may be transferred to the drum 20.

A plurality of card feeding-stacking stations 22, 24, 26 and 28 are mounted on the table top 10, and these stations are positioned to have their mouths disposed adjacent respective ones of the drums 14, 18, 16 and 20. Each of the stations is constructed, like the station 22, to have a pair of guide rails 30 and 32 which are spaced from one another, and which extend in parallel relationship outwardly from the corresponding transport drum. The cards are supported in the feeding-stacking stations between the guide rails in a stacked condition. The cards in each of the feeding-stacking stations are held in stacked relationship by suitable pusher members, like the pusher 34 in the station 22. The pusher 34 is spring biased toward the mouth of the station 22, and it moves forward as cards are fed from the stack in the station 22 to the periphery of the corresponding transport drum 14. Conversely, the pusher 34 moves back in the station as cards are fed from the drum to the station. Feeding-stacking stations of the type under discussion are fully described in Patent No. 2,969,979 granted January 31, 1961, in the name of Alfred M. Nelson et al., and a detailed description of such stations is believed to be unnecessary.

As fully described in the aforementioned Patent No. 2,969,979 each of the feeding-stacking stations 22, 24, 26 and 28 has a feeding mode in which the cards held in a stacked relationship in the station may be controllably and sequentially fed to the corresponding transport drum. Each of the stations also has a stacking mode of operation in which cards carried to its mouth by the corresponding transport drum are deposited into the station.

A gate transfer mechanism 36 is illustrated in FIGURE 1 as being positioned between the drums 16 and 20, and a similar gate transfer mechanism 38 is illustrated as being positioned between the drums 14 and 18. Each of these gate transfer mechanisms may be constructed in accordance with the present invention. As will be described, the gate transfer mechanisms can be controlled selectively to transfer cards between their adjacent drums, and from either one of the two adjacent drums to the other.

The apparatus of FIGURE 1 is capable of performing a large number of card processing and card handling operations. This apparatus is similar to the apparatus described in copending application Serial No. 737,439, filed May 23, 1958, now Patent No. 2,997,174. Suitable transducers may be positioned adjacent the respective drums, and appropriate logical control circuitry may be coupled to the transducers. This logical control circuitry is capable of controlling the apparatus of FIG- URE 1 so that the cards in the different stations may be merged, collated, sorted, or otherwise processed; or so that any desired one or more of the cards in any of the stations may be selected for processing.

The apparatus illustrated in FIGURE 1 is intended to show a typical unit in which the gate transfer mechanisms of the invention may be incorporated. It should be pointed out that when the gate transfer mechanisms 36 or 38 are constructed in accordance with the concepts of the present invention, the cards selectively transferred between their adjacent drums are so transferred without any likelihood of misalignment or jamming, and with a minimum of wear.

Figure 2:
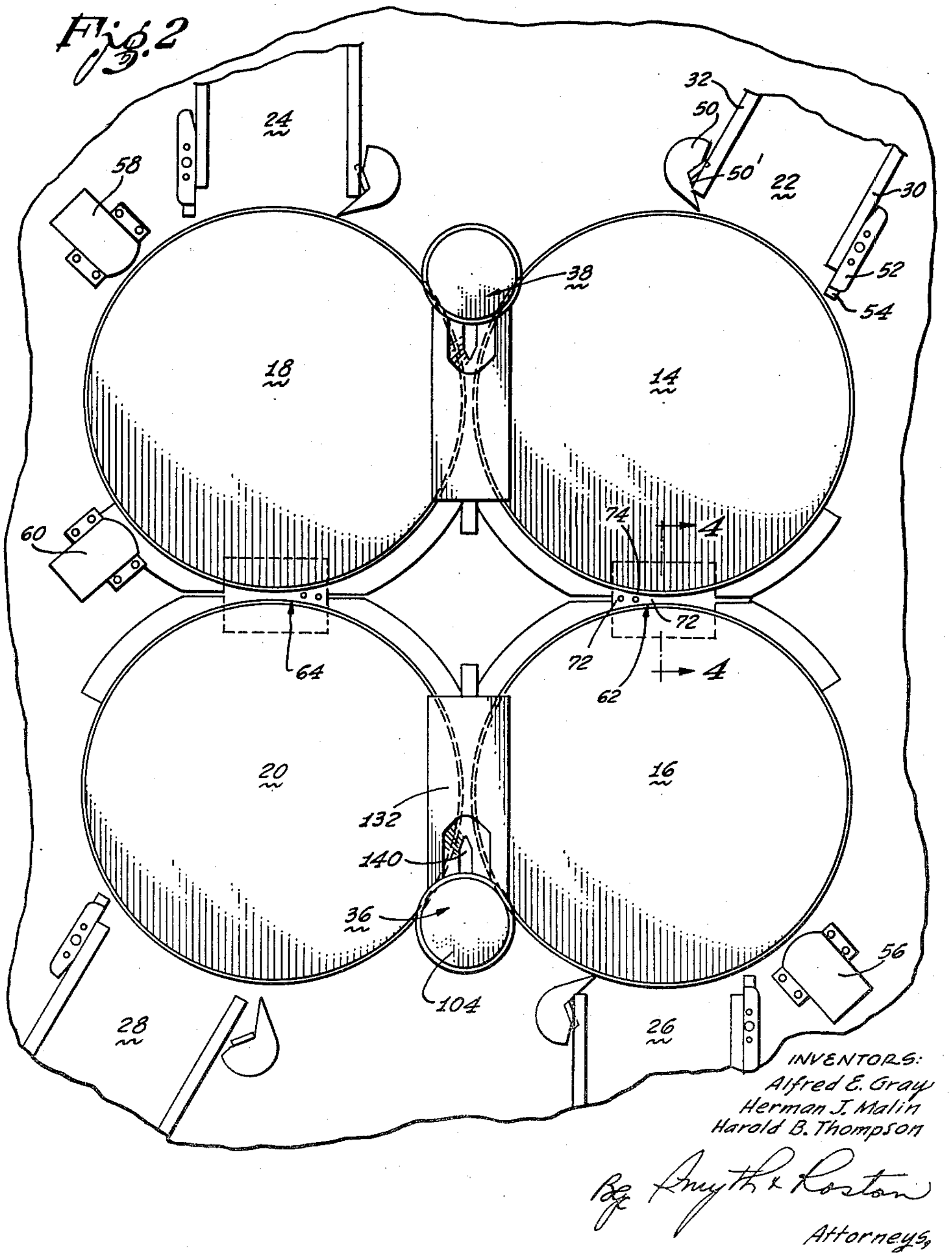
FIGURE 2 is an enlarged fragmentary top plan view of the apparatus of FIGURE 1, and the view of FIGURE 2 illustrates certain components which are associated with the drums and with the stations for handling and processing the cards transported through the apparatus.

The enlarged view of FIGURE 2 illustrates, as mentioned above, various components which may be associated with the drums 14, 16, 18 and 20 to perform desired handling operations on the cards. The station 22, for example, includes a feed head 50 which is positioned adjacent its leading wall 32. The feed head 50, as fully described in the aforementioned Patent No. 2,969,979 is movable between a stand-by position and an operative position. When the feed head 50 is in its operative position, the feeding-stacking station 22 is conditioned to its feeding mode. An elongated member 52 is positioned adjacent the trailing guide rail, or wall, 30 of the station 22. This member 52 has a tongue portion 54 at its leading edge, and the tongue extends into close proximity with the periphery of the vacuum transport drum 14. The tongue 54 defines a feed throat with the periphery of the drum 14. The width of the feed throat is such that one card only can pass at a time through it from the station 22 to the periphery of the drum.

A vacuum pressure is controllably established at the surface 50′ of the feed head 50 when the feed head is in its operative position. This vacuum pressure serves to hold the leading card in the station 22, and the leading card holds the other cards in the station, such other cards being stacked behind the leading card against the pusher 34 of FIGURE 1. However, whenever the vacuum pressure at the surface 50′ of the feed head is interrupted, one or more of the cards can then pass in succession from the station to the periphery of the drum 14 through the feed throat formed by the tongue 54.

The other feeding-stacking stations 24, 26 and 28 may have similar feed heads associated with them, and they may also have corresponding elongated members having tongues which define the respective feed throats with their associated drums. The feed heads at the different stations may be shifted between their respective stand-by and operative opsitions under the control of the logic circuitry referred to above, and the vacuum pressure at the different feed heads can be selectively interrupted under the control of the logic circuitry so that the apparatus may perform a desired card handling operation. The desired controls may be initiated by a transducer means 56 which is positioned adjacent the transport drum 16, and by a pair of transducer means 58 and 60 which are positioned adjacent the transport drum 18. These transducer means may each comprise one or more transducer heads which are positioned to scan different rows of data on the cards carried past them. The transducer heads may, for example, comprise usual electromagnetic transducers when cards having magnetic recordings are being processed.

The transducer means 56 serves to process the cards fed from the station 26 onto the periphery of the drum 16. As a result of such processing, various decisions may be made as to whether such cards are to be stacked in the station 22; or whether the cards are to be transferred to the drum 18 for stacking in the station 24, or for further processing by the transducers 58 and 60 for a subsequent stacking in the station 28 or for a return to the station 26. Likewise, cards positioned in the station 24 and fed from that station to the drum 18 are processed by the transducer means 58 and 60 so that decisions concerning those cards may be made. For example, a control system operative in accordance with signals provided by such transducer means as the transducer means 56, 58 and 60 is fully disclosed in the aforementioned copending application Serial No. 566,404.

Important instrumentalities in performing the decisions referred to above are, of course, the gate transfer mechanisms 36 and 38. For example, the selective control of the gate transfer mechanism 38 decides whether a card carried by the drum 14 will be transferred to the drum 18, or will be carried to the station 22. Likewise, the selective control of the gate transfer mechanism 36 determines whether a card transported by the drum 20 will be transferred to the drum 16 or carried to the station 28.

Figure 3:
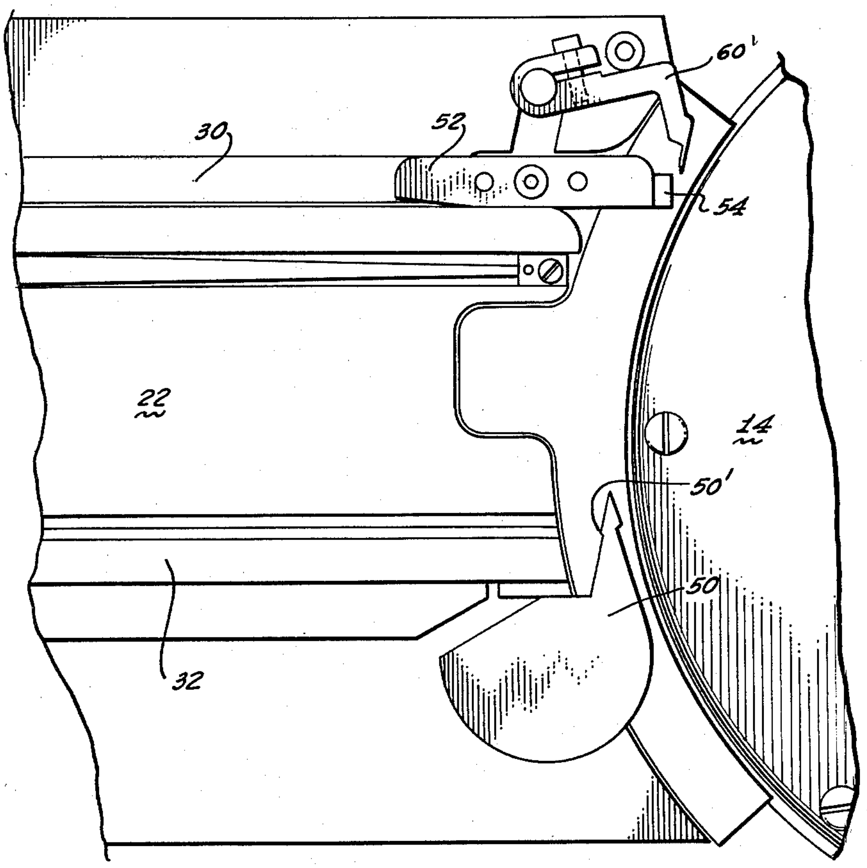
FIGURE 3 is a fragmentary top plan view of one of the feeding-stacking stations illustrated in FIGURES 1 and 2 and showing in greater detail a transfer mechanism which is associated with the station and which serves to control the transfer of cards from the station to the associated transport drum and from the transport drum into the station.

Further details of the feeding-stacking station 22 are shown in FIGURE 3. As noted above, the other stations 24, 26 and 28 may be constructed in a similar manner. The station 22 is illustrated in FIGURE 3 in its feeding mode in which the feed head 50 is moved forward to its operative position so that its surface 50′ may engage the leading card in the station. As noted above, this card is retained in the station so long as the vacuum pressure is exerted at the surface 50′ of the feed head.

The feeding-stacking station of FIGURE 3 is also illustrated as incorporating a stack head 60′. This stack head is illustrated in FIGURE 3 as moved back to its stand-by position. However, for the stacking mode of operation, the stack head 60 is moved forward so that it moves across the tongue 54 to fill completely the feed throat. The stack head has an appropriate slot formed in it to receive the tongue 54. For the stacking mode of operation, the feed head 50 is simultaneously retracted to its stand-by position. Now, any card transported by the drum 14 to the mouth of the station 22 is arrested by the stack head 60, and subsequent cards move under the preceding cards cause each other to be stripped from the periphery of the drum and moved back into the station.

A mechanical card transfer unit 62 is illustrated in FIGURE 2 as being positioned between the drums 16 and 14. A similar mechanical gate transfer unit 64 is illustrated as being positioned between the drums 18 and 20. The unit 62 is mounted on the table top so that it will transfer any card carried to it by the drum 16, from that drum and onto the peripheral surface of the drum 14. Likewise, the transfer unit 64 is positioned to transfer any card carried to it by the drum 18, from the drum 18 and to the peripheral surface of the drum 20.

Figure 4:
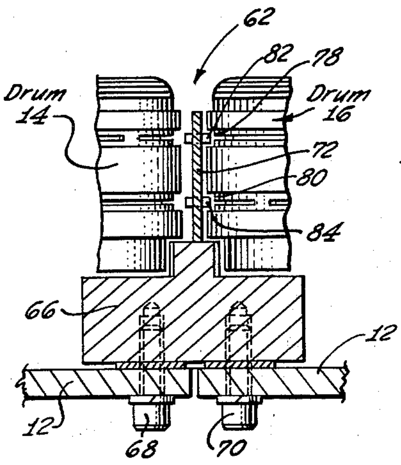
FIGURE 4 is a sectional view substantially on the line 4—4 of FIGURE 2 and illustrating a mechanical gate transfer mechanism which is stationary in nature and which serves to transport the cards carried to it by one of the drums, the cards being transferred to an adjacent drum.

The transfer unit 62 is shown in more detail in FIGURE 4. The unit includes a base portion 66 which is secured to the table top 12 by a pair of screws 68 and 70. The screws extend upwardly through the table top, and they are threaded into the base portion 66. A triangular member 72 (see also FIGURE 2) is fastened to the base 66 by a pair of screws 74. This triangular member has its apex directed towards the periphery of the drum 16 in essentially tangential relationship with that drum. The drums include peripheral grooves, such as the grooves 78 and 80 in the drum 16, and the triangular component 72 has a pair of fingers 82 and 84 which extend into these grooves. These fingers form a smooth guiding surface for the cards transported to the transfer unit by the drum.

As an information storage card is transported to the transfer unit 62, its leading edge moves up over the fingers 82 and 84 and across the triangular member 72 to move the card into the influence of the vacuum pressure at the periphery of the drum 14. The card is then moved onto the periphery of the drum 14 and carried by that drum to the gate transfer mechanism 38. It will be appreciated that the mechanical gate transfer unit 64 may be constructed in the same manner.

The structural details of the gate transfer mechanism 36 are shown in FIGURES 5 and 6. The gate transfer mechanism 38 may be constructed in like manner, and for that reason only the details of the gate transfer mechanism 36 have been illustrated and will be discussed.

The pneumatic gate transfer mechanism 36 of the invention, as illustrated in FIGURES 5 and 6, includes a first housing 100 and a second housing 102. A first solenoid valve 104 is coupled to a feed line 106. The feed line 106 is threaded into an inlet conduit of the housing 102. The solenoid valve 104 has an inlet line 108, and this line may be coupled to any suitable source of pressurized fluid, such as compressed air. A second solenoid valve 110 is coupled to a feed line 112. The feed line 112 is threaded into an inlet conduit of the housing 100. The solenoid valve 110 has an inlet line 114 which is also coupled to the source of pressurized fluid.

The solenoid valves 104 and 110 may be constructed in a manner similar to the valve disclosed and claimed in the aforementioned copending application 685,581 filed September 23, 1957 in the name of Alfred M. Nelson et al. The valves 104 and 110 are electrically controlled so that the pressurized fluid may be selectively introduced to the housing 100 and 102. As may be seen best from FIGURE *5a* and as will become apparent from the subsequent description, the fluid passing through each of the feed lines 106 and 112 provides an individual and distinctive control which is entirely divorced from the control provided by the fluid passing through the other feed line. The valves 104 and 110 and the feed lines 106 and 112 are illustrated on a schematic basis in FIGURE *5a* for purposes of visual clarity and do not correspond exactly in position to the showing of these members in the other figures.

A first plurality of parallel nozzles 116 extend from the housing 100 adjacent the periphery of the drum 20. These nozzles are spaced from one another in a direction transverse to the direction of motion of the peripheral surfaces of the drums 20 and 16. The nozzles direct fluid under pressure, the fluid passing through the feed line 112. The fluid passes through the nozzles 116 in a corresponding first plurality of parallel jet streams and in a direction substantially tangential relative to the periphery of the drum 20. The fluid passing through the nozzles 116 impinge against the leading edges of the cards carried on that drum.

A second plurality of parallel nozzles 118 extend from the housing 102 adjacent the periphery of the drum 16 and communicate with the feed line 106. The nozzles 118 also are spaced from one another in a direction transverse to the direction of motion of the peripheral surfaces of the drums 20 and 16. The nozzles 118 direct fluid under pressure from the housing 102 in a second plurality of parallel jet streams tangentially of the periphery of the drum 16 and against the leading edges of the cards carried on that drum. As will be seen, each of the feed lines 106 and 112 respectively introduces fluid to the coupled pluralities of nozzles 118 and 116 without introducing fluid to the other plurality of nozzles.

The assembly is supported on the table top 10 by a plurality of screws, such as the screws 120, which screws extend upwardly through the table top from its under side. The screws extend through lower spacer members 122 and 124 which support the assembly at a desired height with respect to the peripheral edges of the drums 20 and 16. A lower guide member 126 is supported on the spacer members. The housings 100 and 102 are formed as a single integral unit 125 with two separate inner compartments, and the unit 125 is mounted on the lower guide member 126 by screws such as the screws 128 and 130. An upper guide member 132 is supported on the unit 125 by means of screws, such as the screw

134. The card is guided between the bottom surface of the guide member 132 and the top surface of the guide member 126 so as to be properly positioned in the vertical direction during the transfer of cards between the drums 20 and 16.

A guide member 136 (see FIGURES 5 and 7) of essentially triangular configuration is attached to the unit 125, and the guide is positioned between the nozzles 116 and 118. The triangular guide 136 has a first plurality of grooves formed in one side to receive the nozzles 116 and it has a second plurality of grooves formed in its other side to receive the nozzles 118. The upper guide 132 engages the top of the triangular guide 136 and the lower guide 126 engages the bottom of the triangular guide 136.

The triangular guide 136 has an open central portion 137 and the upper guide 132 has an opening 140 (as also shown in FIGURE 2). The opening 140 in the guide 132 communicates with the central open portion 137 of the guide 136. The triangular guide 136 also has a plurality of axially spaced slots 142 formed in each of its guiding surfaces at the apex of the triangular guide, and these slots communicate with the open central portion 137 of the guide 136. As will be seen from FIGURES 5 and *5a*, the slots 142 extend back a considerable distance from the apex of the triangular guide 136.

The transport drums 20 and 16 extend between the guides 126 and 132 so that their peripheral edges are adjacent respective ones of the two guiding surfaces of the triangular guide 136. Then, when the solenoid valve 104 is activated to introduce pressurized fluid into the housing 102, the resulting jets from the nozzles 118 are directed tangentially against the leading edge of each card transported to the gate transfer mechanism 36 by the transport drum 20. This causes the leading edges of the cards so transported to be moved outwardly from the drum and directed over the guide 136 along the guiding surface of the guide which is adjacent the drum 16, this being shown in FIGURE *5a*. Continued movement of the peripheral surface of the drum 14 causes the card to move across the guide 136 and into the vicinity of the peripheral edge of the drum 16. The vacuum pressure at the peripheral edge of the latter drum then draws the card over the guide and onto that drum.

The action described above proceeds in such a manner that whenever the solenoid valve 104 is activated, the cards carried to the gate transfer mechanism by the drum 20 are smoothly transferred to the drum 16. Likewise, whenever the solenoid valve 110 is actuated, cards carried to the transfer mechanism 36 by the drum 16 are smoothly transferred to the drum 20 as shown in FIGURE 7. In each instance, the upper and lower guides 132 and 126 assure that the transferred cards will not become misaligned during the transfer operation, and that such cards will be carried from one drum to the other with the proper orientation with respect to the peripheries of the drums.

The slots 142 and the guide 136 and the open central portion of the guide, together with the aperture 140 in the upper guide 132 provide a return path for the fluid. For example, the fluid emitted through the nozzles 116 is able to pass from the area adjacent to the drums 20 and 16 by flowing through the slots 142 and the aperture 140. This prevents fluid from remaining in the space beween the drums 20 and 16 and from moving in uncontrolled paths in that space so as to create turbulence. Instead, the pressurized fluid will pass evenly and smoothly out through the slots 142 and the opening 140. This assures that the jets emitted by the nozzles 116 and 118 will be sharp and direct, and that the jets will act positively on the cards in the performance of their transfer function.

A member 150 is rotatably mounted in a bracket 152 between the guides 132 and 126. The member 150 is spaced from the apex of the triangular guide 136 along the longitudinal axis of the guide. The bracket 152 is mounted on the lower guide 126 by a pair of screws 154. A triangular shaped member 151 is mounted adjacent the rotatable member 150, and its apex extends towards the apex of the triangular guide 136. The rotatable member 150 and the member 151 engage the cards transferred by the gate transfer mechanism 36 from the drum 20 to the drum 16, and from the drum 16 to the drum 20, and these members serve to prevent the trailing edges of such cards from flapping against and violently striking the surface of the particular drum to which they are being transferred. The action of the rotatable member 150 and the member 151 on a transferred card is best shown in FIGURE 7. This action of the rotatable member 150 and the member 151 further assists in causing the cards to be smoothly transferred from one drum to the other without any tendency for the transferred cards to become misaligned and jammed, and these members further serve to reduce wear on the cards and to lessen the likelihood of the cards becoming damaged.

The invention provides, therefore, an improved gate transfer mechanism for use in card processing apparatus. The gate transfer mechanism of the invention, as described, is capable of obtaining the transfer of cards from one transport medium to another by the controlled creation of jets of pressurized fluid. The gate transfer mechanism is conceived and constructed so that such jets exhibit a minimum of turbulence for the proper performance of their transfer function. The mechanism is also devised so that the transfer is carried out rapidly and smoothly; with a minimum of wear on the cards and with no tendency for the cards to become misaligned or jammed.

We claim:

1. In apparatus for processing data on a plurality of information storage cards, and which includes a first transport means for the cards and a second transport means for the cards; a gate transfer mechanism positioned adjacent the first transport means and the second transport means to obtain a transfer of cards between the transport means, said mechanism including: gate means disposed relative to the cards on the first transport means and constructed to exert a force on cards transported by the first transport means to cause such cards to be transferred to the second transport means, and means spaced from the gate means for engaging at least the trailing ends of the cards so transferred by the gate means to reduce the force at which such trailing ends strike against the second transport means.

2. In apparatus for processing data on a plurality of information storage cards, and which includes a first transport means for the cards and a second transport means for the cards; a gate transfer mechanism positioned adjacent the first transport means and the second transport means to obtain a transfer of cards between the transport means, said mechanism including: means disposed relative to the cards on the first transport means and constructed to direct fluid under pressure in at least one jet stream against cards carried by the first transport means to obtain a transfer of such cards to the second transport means, and means adjustably positioned relative to said directing means for engaging the cards so transferred thereby to inhibit the trailing ends of the cards from flapping against the second transport means.

3. In apparatus for processing data on a plurality of information storage cards, and which includes first transport means for the cards and second transport means for the cards; a gate transfer mechanism positioned adjacent the first transport means and the second transport means to obtain a transfer of cards between the transport means, said mechanism including: a housing, means coupled to the housing for introducing fluid under pressure into the housing, at least one nozzle extending from the housing for directing fluid under pressure in a jet stream against cards carried by the first transport means to obtain a transfer of such cards to the second transport means, a guide for the cards and positioned adjacent the nozzle to present a guiding surface for the cards transferred from the first transport means to the second transport means, said guide having apertures therein adjacent the nozzle to prevent turbulence in the jet stream issuing from the nozzle, and at least one member adjustably positioned relative to the guide for engaging the cards so transferred from the first transport means to the second transport means to inhibit the trailing ends of such cards from flapping against the surface of the second transport means at the completion of such transfer.

4. In apparatus for processing data on a plurality of information storage cards and which includes first transport means for the cards and second transport means for the cards; a gate transfer mechanism positioned adjacent the first transport means and the second transport means to obtain a transfer of cards between the transport means, said mechanism including: a housing, means disposed relative to the housing for introducing fluid under pressure into the housing, a plurality of nozzles extending from the housing and spaced from one another in a direction transverse to the direction of motion of the cards on the transport means for directing fluid under pressure in a corresponding plurality of jet streams against cards carried by the first transport means to obtain a transfer of such cards to the second transport means, a guide for the cards affixed to the housing and having a first surface positioned adjacent the nozzles and a second surface, said second surface presenting a guiding surface for the cards transferred from the first transport means to the second transport means, at least one of the surfaces having apertures therein to prevent turbulence in the jet streams issuing from the nozzles, and at least one rotatable member spaced axially from the guide for engaging the cards so transferred from the first transport means to the second transport means to inhibit the trailing ends of such cards from flapping against the second transport means.

5. In apparatus for processing data on a plurality of information storage cards, and which includes a first transport means for the cards and a second transport means for the cards; a gate transfer mechanism positioned adjacent the first transport means and the second transport means for obtaining a transfer of cards between the transport means, said mechanism including: a first housing, means disposed relative to the first housing for introducing fluid under pressure into the first housing, a second housing, means disposed relative to the second housing for introducing fluid under pressure into the second housing, a first plurality of nozzles extending from the first housing and spaced from one another in a direction transverse to the direction of motion of cards on the transport means for directing fluid under pressure in a corresponding first plurality of jet streams against the cards carried by the first transport means to obtain a trainsfer of such cards to the second transport means, a second plurality of nozzles extending from the second housing and spaced from one another in a direction transverse to the direction of motion of the cards on the transport means for directing fluid under pressure in a corresponding second plurality of jet streams against the cards carried by the second transport means to obtain a transfer of such cards to the first transport means, a guide for the cards and positioned between the first plurality of nozzles and the second plurality of nozzles to present a first guiding surface for the cards transferred from the first transport means to the second transport means and to present a second guiding surface for cards transferred from the second transport means to the first transport means, and at least one rotatable member spaced from the guide for engaging the cards so transferred from the first to the second transport means to prevent the trailing edges of such cards from violently striking the surface of the second transport means at the completion of such a transfer and for engaging the cards so transferred from the second transport means to the first transport means to prevent the trailing edges of such latter cards from violently striking the surface of the first transport means at the completion of such latter transfer.

6. The combination defined in claim 5 in which said guide has a triangular configuration with an open central portion, and in which said first and second guiding surfaces each have apertures therein communicating with the open central portion of the guide to prevent turbulence in the jet streams of the first and second plurality.

7. In apparatus for processing data on a plurality of information storage cards, and which includes first transport means for the cards and second transport means for the cards; a gate transfer mechanism positioned adjacent the first transport means and the second transport means to obtain a transfer of cards between the transport means, said mechanism including: a housing, means disposed relative to the housing for introducing fluid under pressure into the housing, at least one nozzle extending from the housing for directing fluid under pressure in a jet stream against cards carried by the first transport means to obtain a transfer of such cards to the second transport means, and a guide for the cards and positioned adjacent the nozzle to present a guiding surface for the cards transferred from the first transport means to the second transport means and constructed to prevent turbulence in the jet stream issuing from the nozzle.

8. In apparatus for processing data on a plurality of information storage cards, and which includes first transport means for the cards and second transport means for the cards; a gate transfer mechanism positioned adjacent the first transport means and the second transport means to obtain a transfer of cards between the transport means, said mechanism including: a housing, means disposed relative to the housing for introducing fluid under pressure into the housing, at least one nozzle extending from the housing for exerting a pneumatic force against cards carried by the first transport means to obtain a transfer of such cards to the second transport means, and a guide for the cards and affixed to the housing and having a surface positioned adjacent the nozzles, said surface having apertures therein to prevent turbulence in the jet streams issuing from the nozzle.

9. In apparatus for processing data on a plurality of information storage cards, and which includes first transport means for the cards and second transport means for the cards; a gate transfer mechanism positioned adjacent the first transport means and the second transport means to obtain a transfer of cards between the transport means, said mechanism including: a first housing, means disposed relative to the first housing for introducing fluid under pressure into the first housing, a second housing means disposed relative to the second housing for introducing fluid under pressure into the second housing, at least a first nozzle extending from the first housing for directing fluid under pressure in a first jet stream against the cards carried by the first transport means to obtain a transfer of such cards to the second transport means, at least a second nozzle extending from the second housing for directing fluid under pressure in a second jet stream against the cards carried by the second transport means to obtain a transfer of such cards to the first transport means, a guide for the cards and positioned between the first nozzle and the second nozzle to present a first guiding surface for the cards transferred from the first transport means to the second transport means and to present a second guiding surface for cards transferred from the second transport means to the first transport means, said guide having a triangular configuration with an open central portion, and said first and second guiding surfaces each having apertures therein communicating with the open central portion of the guide to prevent turbulence in the jet streams of the first and second pluralities.

10. In apparatus for processing data on a plurality of information storage cards, and which includes a first transport means for the cards and a second transport means for the cards; a gate transfer mechanism positioned adjacent the first transport means and the second transport means for obtaining a transfer of cards between the transport means, said mechanism including: a housing, means disposed relative to the housing for introducing fluid under pressure into the housing, at least one nozzle extending from the housing for directing fluid under pressure against cards carried by the first transport means to obtain a transfer of such cards to the second transport means, a triangular guide for the cards and affixed to the housing and having a first guiding surface adjacent the nozzle and having a second guiding surface, said triangular guide having an open central portion and at least said first guiding surface having apertures extending into the open central portion to prevent turbulence in the fluid stream issuing from the nozzle, a top guide extending across the first and second transport means and over the triangular guide, and a bottom guide extending across the first and second transport means and under the triangular guide, said top and bottom guides cooperating to maintain a desired alignment of the transferred cards and at least one of the same having an aperture aligned with the open central portion of the triangular guide.

11. In apparatus for processing data on a plurality of information storage cards, and which includes first transport means for the cards and second transport means for the cards, a gate transfer mechanism positioned adjacent the first transport means and the second transport means to obtain a transfer of cards between the transport means, said mechanism including: means disposed relative to the cards on the first transport means and constructed to direct streams of fluid against cards on the first transport means to obtain a transfer of the cards from the first transport means to the second transport means, means disposed relative to the fluid means and constructed to inhibit turbulence in the streams of fluid directed against the cards on the first transport means, and means disposed relative to the cards being transferred from the first transport means to the second transport means and constructed to inhibit the trailing ends of such cards from flapping against the second transport means.

12. In apparatus for processing data on a plurality of information storage cards, and which includes first transport means for the cards and second transport means for the cards, a gate transfer mechanism positioned adjacent the first transport means and the second transport means to obtain a transfer of cards between the transport means, said mechanism including: a housing having at least one nozzle in the housing, the housing and nozzle being disposed between the first and second transport means on one side of the position of transfer and being disposed relative to cards on the first transport means to direct a stream of fluid against the cards on the first transport means for obtaining a transfer of cards to the second transport means, means including a valve and including control means for the valve and disposed relative to the housing and constructed to provide a controlled introduction of fluid to the housing in accordance with the control provided over the operation of the valve by the control means, transducing means disposed relative to the transported cards for processing particular information on the cards for a controlled operation of the control means, means disposed in facing relationship to the housing and disposed on the opposite side of the position of card transfer relative to the housing and being provided with a configuration to guide the transfer of the trailing ends of the cards from the first transport means to the second transport means, and means operatively coupled to the housing for facilitating a flow of fluid without turbulence through the nozzle and against the cards.

13. In apparatus for processing data on a plurality of information storage cards, first transport means for the cards, second transport means for the cards and disposed relative to the first transport means to obtain a transfer of cards from the first transport means to the second transport means, gate transfer means disposed between the first and second transport means on one side of the first and second transport means at the position of the transfer of cards between the transport means and operatively coupled to the cards on the first transport means to obtain a transfer of the cards to the second transport means, and means disposed between the first and second transport means on the opposite side of the transport means from the gate transfer means and operative upon to the cards being transferred from the first transport means to the second transport to guide the movement of the cards during such transfer.

14. In apparatus for processing data on a plurality of information storage cards, the combination of: first transport means for the cards, second transport means for the cards and disposed relative to the first transport means to obtain a transfer of cards from the first transport means to the second transport means, means including at least one nozzle disposed relative to the cards on the first transport means and constructed to direct fluid against the cards on the first transport means to obtain a transfer of cards to the second transport means, means including a valve operatively coupled to the nozzle for providing a controlled introduction of fluid to the nozzle, and means disposed between the nozzle and the positions of coupling between the first and second transport means and provided with passages to obtain a flow of the fluid from the space between the nozzle and the position of transfer of the cards between the transport means to prevent the fluid from becoming turbulent in this space after the action of such fluid on the cards on the first transport means.

15. In apparatus for processing data on a plurality of information storage cards, the combination of: first transport means for the cards, second transport means for the cards and disposed relative to the first transport means to obtain a transfer of cards from the first transport means to the second transport means, means including a gate disposed relative to the cards on the first transport means and constructed to direct a fluid under pressure against such cards for a transfer of the cards from the first transport means to the second transport means, and means disposed between the drums for providing a path for the flow of fluid from the space between the drums to prevent turbulence from being created in this space.

16. In apparatus for processing data on a plurality of information storage cards, first transport means for the cards, second transport means for the cards and disposed relative to the first transport means to obtain a transfer of cards between the first and second transport means, a first housing disposed on one side of the first and second transport means relative to the position of coupling between the transport means, at least one nozzle extending from the first housing and positioned relative to the cards on the first transport means to direct a stream of fluid against the cards on the first transport means for obtaining a transfer of the cards to the second transport means, means including a valve operatively coupled to the nozzle for controlling the introduction of fluid to the nozzle, transducing means disposed relative to the cards on the first transport means for processing particular information on the cards for a controlled operation of the valve, and a member disposed on the opposite side of the first and second transport means from the housing and shaped and adjustably positioned to guide the movements of the cards from the first transport means to the second transport means.

17. In apparatus for processing data on a plurality of information storage cards, first transport means for the cards, second transport means for the cards and disposed relative to the first transport means to obtain a transfer of cards between the first and second transport means, a housing disposed in contiguous relationship to the first and second transport means at the position of coupling between the transport means, at least a first nozzle extending from the housing at one side of the housing and disposed relative to the cards on the first transport means and constructed to direct a stream of fluid under pressure through the nozzle and against the cards on the first transport means for obtaining a transfer of the cards to the second transport means, means coupled to the first nozzle for providing a controlled introduction of fluid to the first nozzle, a second nozzle extending from the housing at the opposite side of the housing from the first nozzle and disposed relative to the cards on the second transport means and constructed to direct a stream of fluid under pressure through the second nozzle and against the cards on the second transport means for obtaining a transfer of such cards to the first transport means, and means coupled to the second nozzle for providing a controlled introduction of fluid to the second nozzle.

18. In apparatus for processing data on a plurality of information storage cards and which includes first transport means for the cards and second transport means for the cards, gate transfer mechanism including a housing positioned in contiguous relationship to the first and second transport means, a first nozzle disposed in the housing at one side of the housing and in contiguous relationship to the cards on the first transport means to direct a pneumatic force against the cards for obtaining a transfer of the cards to the second transport means, a first feedline communicating with the first nozzle, means including a first valve coupled to the first feedline for obtaining a controlled operation of the valve to obtain a controlled production of the pneumatic force through the first nozzle, first transducing means disposed relative to the cards on the first transport means for processing particular information on the cards for a controlled operation of the first valve, a second nozzle extending through the housing on the opposite side of the housing from the first nozzle and disposed in contiguous relationship to the cards on the second transport means for directing a pneumatic force against such cards for obtaining a transfer of the cards to the first transport means, a second feedline communicating with the second nozzle, means including a second valve coupled to the second feedline for obtaining a controlled operation of the valve to obtain a controlled production of the pneumatic force through the second nozzle, and second transducing means disposed relative to the cards on the second transport means for processing particular information on the cards for a controlled operation of the second valve.

19. The combination set forth in claim 18 in which means are disposed in contiguous relationship to the first and second transport means for guiding the transfer of the cards from the first transport means to the second transport means and from the second transport means to the first transport means.

References Cited in the file of this patent

UNITED STATES PATENTS

| | | |
|---|---|---|
| 1,595,478 | Minton | Aug. 10, 1926 |
| 2,686,052 | Winkler et al. | Aug. 10, 1954 |
| 2,752,154 | Nelson | June 26, 1956 |
| 2,804,974 | Noon | Sept. 3, 1957 |
| 2,881,917 | Brown et al. | Apr. 14, 1959 |
| 2,905,466 | Azari et al. | Sept. 22, 1959 |